United States Patent [19]
Camp

[11] 3,761,875
[45] Sept. 25, 1973

[54] COMBINATION AUTOMOTIVE WARNING DEVICE

[76] Inventor: Richard H. Camp, P.O. Box 62, Haines, Oreg. 97833

[22] Filed: Nov. 19, 1971

[21] Appl. No.: 203,096

[52] U.S. Cl. ............... 340/67, 200/61.89, 340/70, 340/91
[51] Int. Cl. ............................................. B60g 1/22
[58] Field of Search ...................... 200/61.89, 86.5; 340/66, 67, 70–74, 81, 84, 87, 89, 91, 94, 110–112, 118

[56] References Cited
UNITED STATES PATENTS

| | | | |
|---|---|---|---|
| 1,622,361 | 3/1927 | Wall et al. | 340/91 |
| 1,719,394 | 7/1929 | Daniel | 340/91 UX |
| 2,228,021 | 1/1941 | Van Vleck | 340/84 UX |
| 2,552,665 | 5/1951 | Cirone | 340/66 UX |
| 2,650,963 | 9/1953 | Graveno | 340/71 X |
| 2,740,104 | 3/1956 | Nallinger | 340/84 |

FOREIGN PATENTS OR APPLICATIONS

| | | | |
|---|---|---|---|
| 1,509,574 | 12/1967 | France | 340/66 |
| 200,184 | 7/1923 | Great Britain | 340/67 |
| 309,672 | 4/1929 | Great Britain | 340/89 |

Primary Examiner—Kenneth N. Leimer
Attorney—John W. Kraft

[57] ABSTRACT

The combination automotive warning device includes a fixture and a controlling means for controlling a deceleration indicating apparatus. The electric control means for controlling deceleration indicating apparatus comprises a bolt having a metal shaft connected by a suitable wire with a decelerator indicating lamp, an adjusting head, and a threaded shaft provided about the upper portions of the metal shaft, the threaded shaft being made of an electrically insulating material and being operable to replace an idler adjusting screw of a carburetor of a vehicle, the lamp having its remaining wire connected to a suitable source of electrical energy. The fixture comprises a fixture operable to be mounted on the rearwardmost end of a vehicle, the fixture including a base assembly having a base plate and walls operable to divide the base plate into regions, a lens portion fastened to the base assembly having a suitably colored lens for a region indicating backing-up of a vehicle, a suitably colored lens for a region indicating stopping and turning of a vehicle, and a suitably colored lens for a region indicating deceleration of a vehicle.

2 Claims, 7 Drawing Figures

Patented Sept. 25, 1973

RICHARD H. CAMP
INVENTOR.

BY

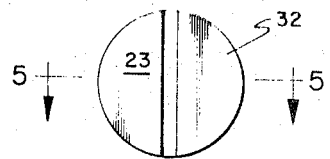
FIG. 4
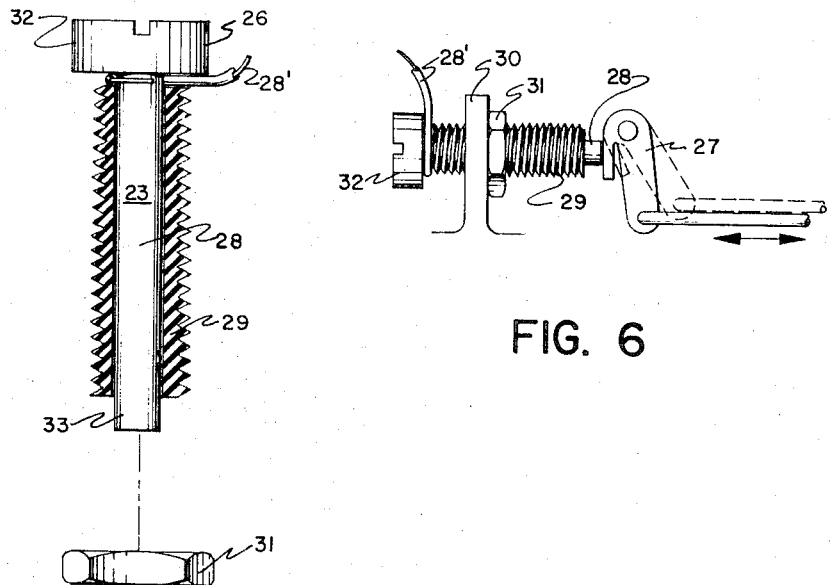
FIG. 5
FIG. 6
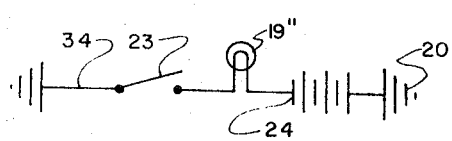
FIG. 7
RICHARD H. CAMP
INVENTOR.

3,761,875

COMBINATION AUTOMOTIVE WARNING DEVICE

FIELD OF INVENTION

Automotive signaling apparatus and more particularly signaling apparatus provided with means to signal deceleration as a result of release of a vehicle's throttle.

DESCRIPTION OF THE PRIOR ART

Means commonly used and employed to indicate deceleration as a result of release of a throttle have generally involved manual signaling means. This may be done by hand signals, or by manually engaging a mechanical warning apparatus. Mechanical warning apparatus have employed a flasher, and have, by convention, been given an emergency status. In both manual and manual electrical signaling, a specific thought process must be undertaken; in neither case is the signal made of a reflex action.

Accordingly it is an object of the present invention to provide means for signaling a deceleration by automatic means as a result of a release of a throttle.

It is another object of this invention to provide signaling means in combination with conventionally known signaling fixtures indicating turn, stop, and back-up.

These and other objects shall become apparent from the description following, it being understood that modifications may be made without affecting the teachings of the invention here set out.

SUMMARY OF THE INVENTION

Generally, the combination automotive warning device of this invention includes a fixture and a controlling means for controlling a deceleration indicating apparatus. The electric control means for controlling deceleration indicating apparatus comprises a bolt having a metal shaft connected by a suitable wire with a decelerator indicating lamp, an adjusting head, and a threaded shaft provided about the upper portions of the metal shaft, the threaded shaft being made of an electrically insulating material and being operable to replace an idler adjusting screw of a carburetor of a vehicle, the lamp having its remaining wire connected to a suitable source of electrical energy. The fixture comprises a fixture operable to be mounted on the rearwardmost end of a vehicle, the fixture including a base assembly having a base plate and walls operable to divide the base plate into regions, a lens portion fastened to the base assembly having a suitably colored lens for a region indicating backing-up of a vehicle, a suitably colored lens for a region indicating stopping and turning of a vehicle, and a suitably colored lens for a region indicating deceleration of a vehicle.

A more thorough and comprehensive understanding may be had from the detailed description of the preferred embodiment when read in connection with the drawings forming a part of this specification.

BRIEF DESCRIPTION OF THE DRAWINGS

FIG. 4 is a top plan view of the throttle warning switch of this invention.

FIG. 5 is a cross-sectional view taken substantially along the lines 5—5 of the FIG. 4.

FIG. 6 is a side elevational view of the throttle warning switch, shown in combination with its switch linkage, and shown with the linkage in a second position in broken lines for illustrative purposes.

FIG. 7 is a schematic diagram of the simple electrical circuit of the throttle warning switch.

DETAILED DESCRIPTION OF THE PREFERRED EMBODIMENT

Figure 1:
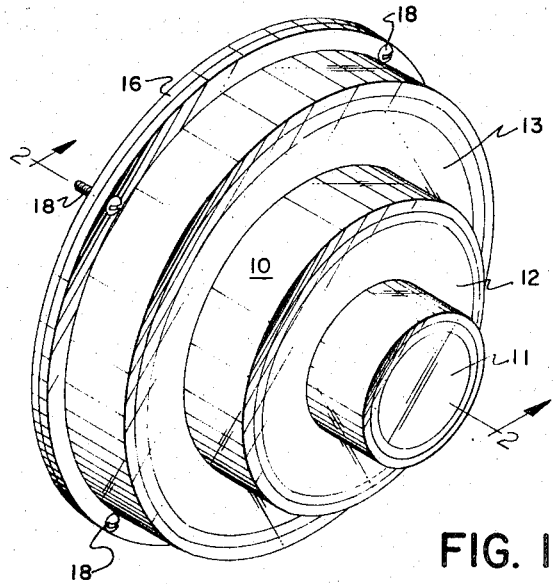
FIG. 1 is a left front perspective view of the combination automotive warning device of this invention.

Referring now to the drawings, and more particularly to the FIG. 1, the combination automotive warning device tail fixture of this invention is shown to advantage and identified by the numeral 10. It is intended that the tail fixture 10 be disposed at the rearwardmost end of a vehicle. The tail fixture 10 may be conveniently divided into a back-up light region 11, a stop-turn region 12, and a throttle deceleration region 13. The preferred embodiment here taught utilizes a design employing three concentric circular regions. The centermost region 11 contains a back-up light and lens which by convention is a white colored lens. Contiguously disposed to the region 11 is a concentric ring region 12 indicating stopping or turning. The region 12 is provided with suitable lamp means and lens which by convention is a red colored lens. The outermost concentric ring region 13 is intended to indicate deceleration as a result of the release of a vehicle's throttle. It is to be understood that the region 13 is provided with suitable lamp means and lens which has a third color set by convention. Although concentric rings have been used in this description, other shapes and arrangements of color codes may be used satisfactorily.

Figure 2:
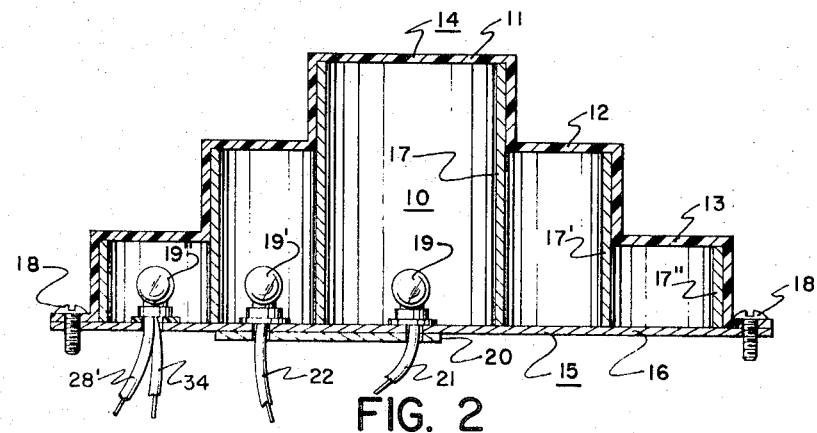
FIG. 2 is a cross-sectional view taken substantially along the lines 2—2 of the FIG. 1 showing the interior configuration of this invention.

Referring now to the FIG. 2, the interior configuration of the tail fixture 10 includes a lens portion 14 and a base assembly 15. The lens portion 14 may be fabricated of a suitable translucent material including a lens portion of a suitable color for each of the regions. In practice, it has been found to advantage to mold the lens portion 14 into a lens body operable to retain the lenses. The base assembly 15 comprises a base plate 16 and a plurality of region dividing walls 17, 17', and 17''. The base plate 16 is provided with holes operable to receive fasteners 18 which hold the fixture 10 to the vehicle body (not shown). It has been found to advantage to dispose the holes distally in the outer perimeter of the base plate 16 to permit the fasteners 18 to engage the lens body 14. The dividing walls 17, 17', and 17'' are disposed apart at suitable intervals to divide and to screen the light regions 11, 12, and 13 from each other. The walls 17, 17', and 17'' provide support to the lens portion 14. In this embodiment, the walls are three concentrically disposed ring-like walls fastened to the plate 16. It has been found to advantage to fabricate the base assembly 15 of a metal having a reflective finish.

Figure 3:
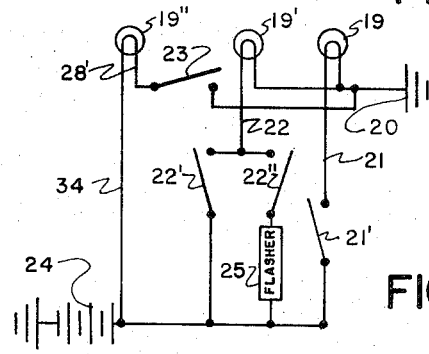
FIG. 3 is a schematic diagram of the electrical apparatus of this invention.

Each of the regions 11, 12, and 13 is provided with a lamp 19, 19', and 19''. As shown by the schematic diagram in the FIG. 3, the lamps 19 and 19' are grounded by their respective socket portions through the base plate 16 of the base assembly 15 to a common ground 20. The common ground 20 may be a metal strip disposed on the body contacting side of the base plate 16, as shown more clearly in the FIG. 2. The lamp 19'' is grounded by the wire 28' through the throttle switch assembly 23, as hereinafter later described, the socket portion thereof being insulated from the base 16. Referring again to the FIG. 3, each of the lamps 19 and 19' is provided through connecting circuits 21 and 22 with switching means 21', 22', and 22'' which are connected to a common power source 24. The centrally disposed back-up region 11 is provided with a commonly known back-up switching means 21'. The stop-turn region 12 is provided with a commonly known circuit, such as stop switching means 22', connected to the vehicle brake linkage (not shown) and a flasher switching means 22'' having a flasher 25. It is to be understood that the stop-turn region 12 may be controlled by separate circuits 22 and lamps 19'. The throttle deceleration region 13 is provided with a throttle switch assembly 23.

As shown by the FIG. 4, the throttle switch assembly 23 is disposed in the vehicle carburetor (not shown). The throttle switch assembly 23 comprises a bolt 26, a throttle linkage 27, and a wire 28' communicatingly connecting the lamp 19'', as shown more clearly by the FIG. 6. Referring now to the FIG. 5, the bolt 26 comprises a metal rod portion 28 having a threaded shaft portion 29. The shaft 29 is fabricated from an insulating material, such as nylon. The threads of the shaft portion 29 are operable to engage the idler screw post 30 of the vehicle carburetor and a locking nut 31. That is to say that the bolt 26 is operable to be substituted for a commonly known idler adjusting screw of the vehicle carburetor. The metal rod portion 28 of the bolt 26 is provided with a head portion 32 operable to be selectively adjusted by a variety of means, such as a screw driver. The bolt 26 at its end opposite the head 32 includes a projecting portion 33 not covered by the threaded shaft portion 29, as shown more clearly by the FIG. 5. An electrical wire 28' connects the bolt 26 to the grounding leg of the lamp 19''. An electrical wire 34 connects the opposite positive leg of the lamp 19'' to the power source of the vehicle. As shown to advantage in the FIG. 7, the circuit of the grounding leg is completed when the throttle linkage contacts the portion 28, since the engine to which the throttle linkage 27 is connected is grounded. It has been found to advantage to provide a receiving area between the head 32 and the insulating threaded shaft portion 29 to permit the electrical wire 28' to be connected to the metal rod 28, such as by soldering. The bolt 26 may be installed in the same way as a commonly known idler adjusting screw. It is to be understood that a further embodiment of the tail fixture 10 includes a single deceleration region 13 and throttle switch assembly 23.

Referring now to the FIG. 6, in operation in a vehicle, provided with the tail fixture 10, which is decelerating as a result of the release of the throttle, the throttle linkage 27 contacts the projecting portion 33 of the bolt 26 completing the grounding leg of the circuit to illuminate the lamp 19''. When the vehicle is accelerating or moving, the throttle linkage mechanically pulls the throttle linkage 27 away from the projecting portion 33 out of contact with the projecting portion 33.

Having thus described in detail a preferred apparatus which embodies the concepts and principles of the invention and which accomplishes the various objects, purposes and aims thereof, it is to be appreciated and will be apparent to those skilled in the art that many physical changes could be made in the apparatus without altering the inventive concepts and principles embodied therein. Hence, it is intended that the scope of the invention be limited only to the extent indicated in the appended claims.

I claim:

1. A combination automotive warning device comprising a fixture being mounted on the rearwardmost end of a vehicle, said fixture including a base assembly having a base plate and walls dividing said base plate into regions, a lens portion fastened to said base assembly having a first colored lens for a region indicating backing-up of said vehicle, a second colored lens for a region indicating stopping and turning of said vehicle, and a third colored lens for a region indicating deceleration of said vehicle; an electric control means for controlling said deceleration region, including a bolt having a metal shaft communicatingly connected by a suitable wire with a deceleration indicating lamp in said deceleration region, an adjusting head, and a threaded shaft provided about the upper portions of said metal shaft, said threaded shaft fabricated from an electrically insulating material and said threaded shaft being an idler adjusting screw of a carburetor of said vehicle, said lamp having its remaining wire connected to a suitable source of electrical energy; and electrical control means for selectively controlling lamps in said back-up and said stopping and turning regions.

2. The apparatus of claim 1, wherein said fixture is divided into concentric circular regions.

* * * * *